(12) United States Patent
Nusier et al.

(10) Patent No.: US 9,493,189 B2
(45) Date of Patent: Nov. 15, 2016

(54) SUBFRAME FOR VEHICLE INCLUDING LEVER FOR DETACHING SUBFRAME FROM UNDERBODY DURING FRONT IMPACT

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 61 days.

(21) Appl. No.: 14/269,123

(22) Filed: May 3, 2014

(65) Prior Publication Data

US 2015/0314807 A1    Nov. 5, 2015

(51) Int. Cl.
  *B62D 21/15* (2006.01)
  *B62D 21/11* (2006.01)
  *B60R 13/08* (2006.01)
  *B60R 19/18* (2006.01)

(52) U.S. Cl.
  CPC ............ *B62D 21/155* (2013.01); *B62D 21/11* (2013.01); *B60R 13/083* (2013.01); *B60R 19/18* (2013.01); *B62D 21/152* (2013.01)

(58) Field of Classification Search
  CPC ... B60R 19/18; B60R 13/083; B62D 21/152; B62D 21/155; B62D 21/11
  USPC .............. 296/187.09, 189; 280/784; 180/291
  See application file for complete search history.

(56) References Cited

U.S. PATENT DOCUMENTS

| | | | |
|---|---|---|---|
| 7,229,099 B2 * | 6/2007 | Reim et al. | 280/784 |
| 7,393,016 B2 * | 7/2008 | Mitsui | B62D 25/08 180/232 |
| 8,620,529 B2 | 12/2013 | Faruque et al. | |
| 2013/0270861 A1 * | 10/2013 | Young et al. | 296/187.09 |

FOREIGN PATENT DOCUMENTS

CN           202107022 U       1/2012

* cited by examiner

*Primary Examiner* — Joseph D Pape
*Assistant Examiner* — Dana Ivey
(74) *Attorney, Agent, or Firm* — Jason C. Rogers; Bejin Bieneman PLC

(57) ABSTRACT

A chassis assembly of a vehicle includes a frame, an underbody supported by the frame, and a subframe connected to the underbody. A connection connects the subframe and the underbody. A lever extends from the subframe to the frame. During a frontal impact of the vehicle, the lever leverages against the frame to detach the connection from the underbody. This movement of the subframe relative to the frame and the detachment of the connection from the underbody absorbs energy during the frontal impact and results in a softer pulse and a reduced Vehicle Pulse Index.

20 Claims, 8 Drawing Sheets

SUBFRAME FOR VEHICLE INCLUDING LEVER FOR DETACHING SUBFRAME FROM UNDERBODY DURING FRONT IMPACT

BACKGROUND

A vehicle, such as an automobile, includes a frame and an underbody supported by the frame. The vehicle typically includes a subframe for supporting various components of an engine, drivetrain, and/or suspension of the vehicle. The subframe is typically mounted to the underbody of the vehicle with bolts, welding, etc. The subframe extends forwardly from the underbody toward a front bumper of the vehicle.

During frontal impacts of the vehicle, such as those defined by Federal Motor Vehicle Safety Standards (FMVSS) and Insurance Institute for Highway Safety (IIHS) standards, front structural components of the vehicle deform to absorb energy. Subframes of some vehicles are not designed to detach from the underbody. Such designs typically require additional energy absorbing features and restraint systems to properly handle energy during a frontal impact.

Other subframes are designed to detach from the underbody during frontal impact to change the pulse and Vehicle Pulse Index during the frontal impact. Detachable subframes can be designed to shear the connection between the subframe and the underbody; however, this shearing can create design difficulties. There remains an opportunity to design a subframe that effectively detaches from the underbody during frontal impact.

DETAILED DESCRIPTION

Figure 6:
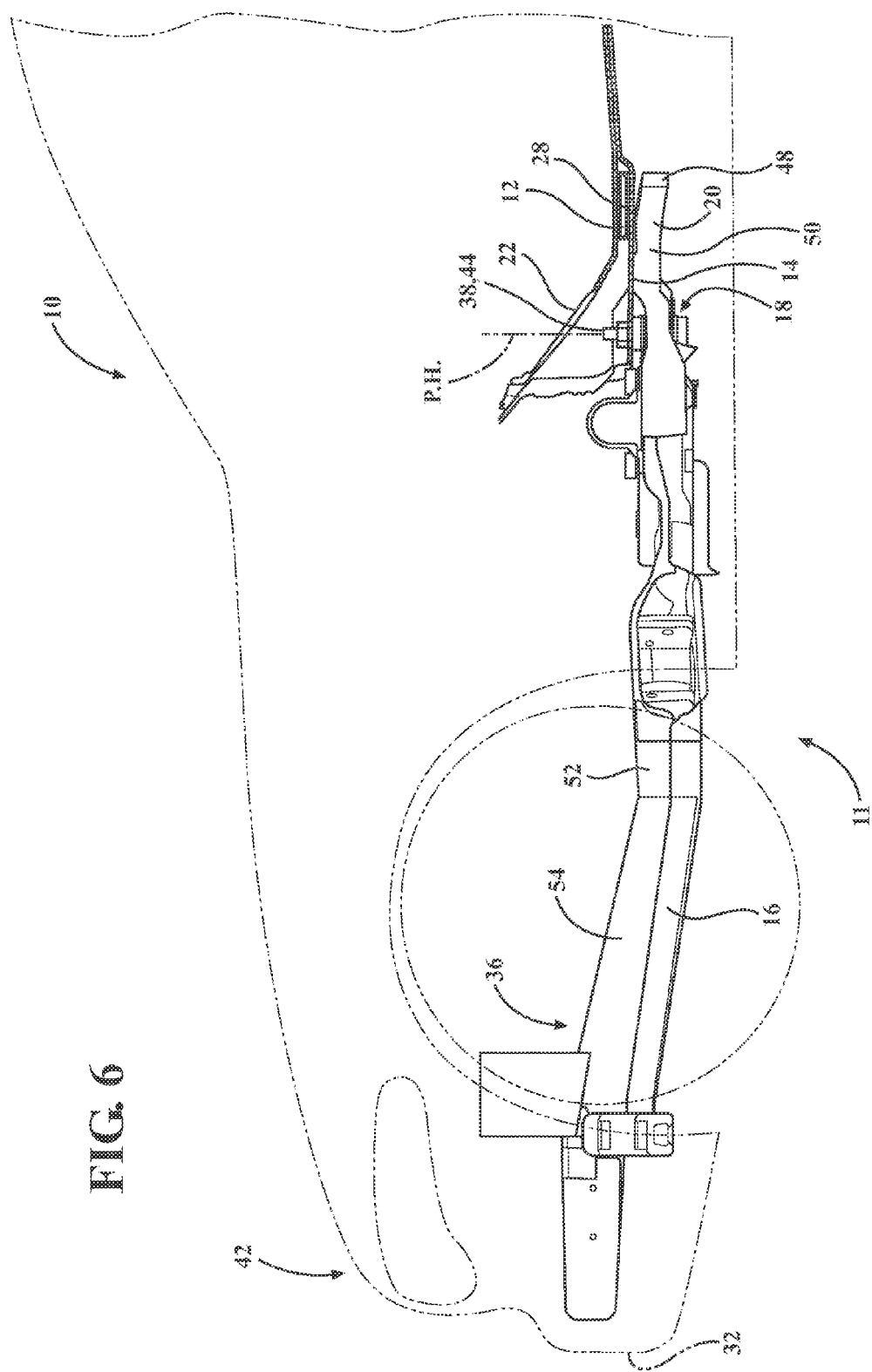
FIG. 6 is a side view of the subframe and a portion of the underbody and a portion of the frame with the subframe connected to the underbody and with the frame in an unloaded position prior to a frontal impact.
Figure 7:
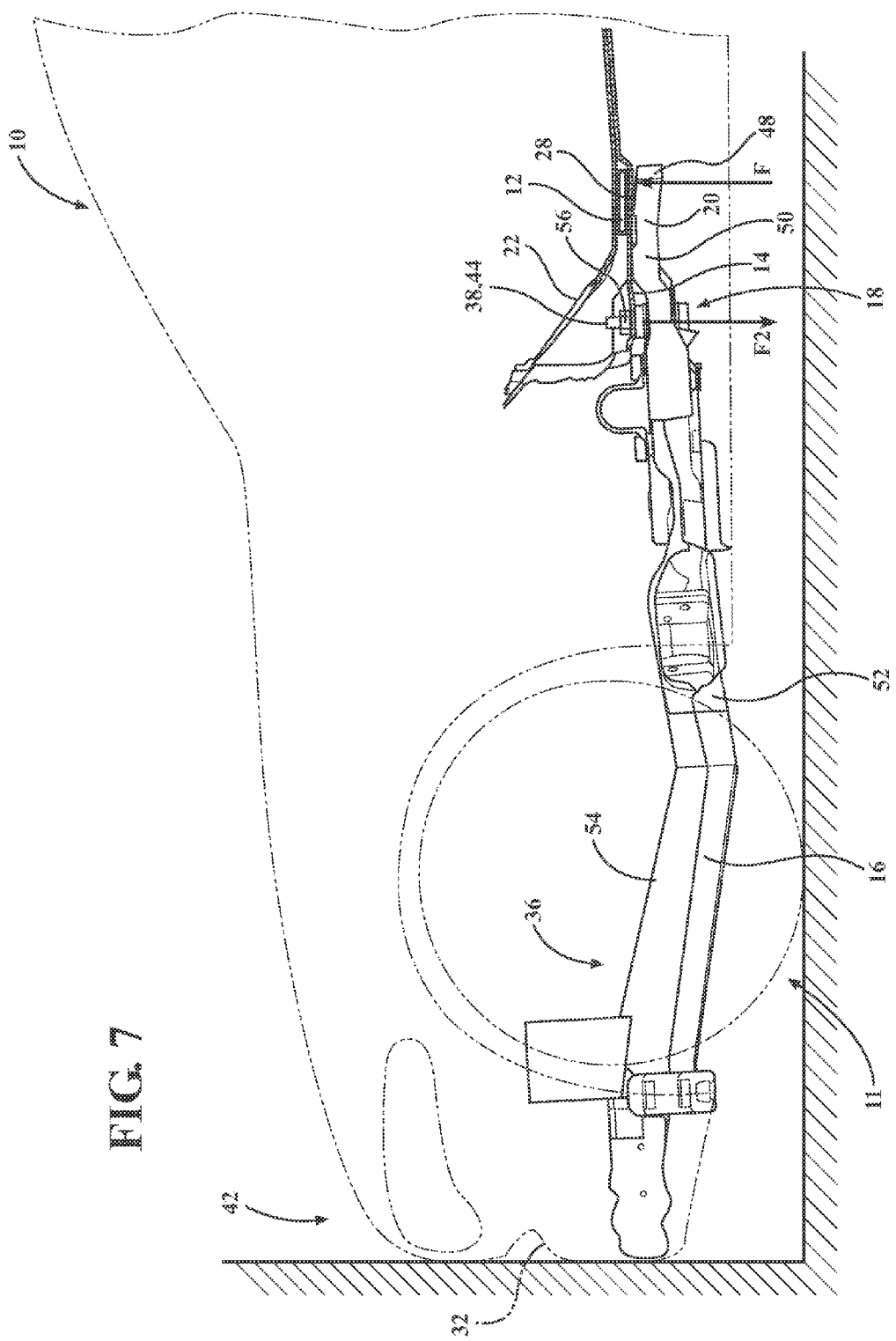
FIG. 7 is the side view of FIG. 6 during rotation of the subframe relative to the frame during a frontal impact with arrows identifying forces between the lever and the frame and forces at the connection.
Figure 8:
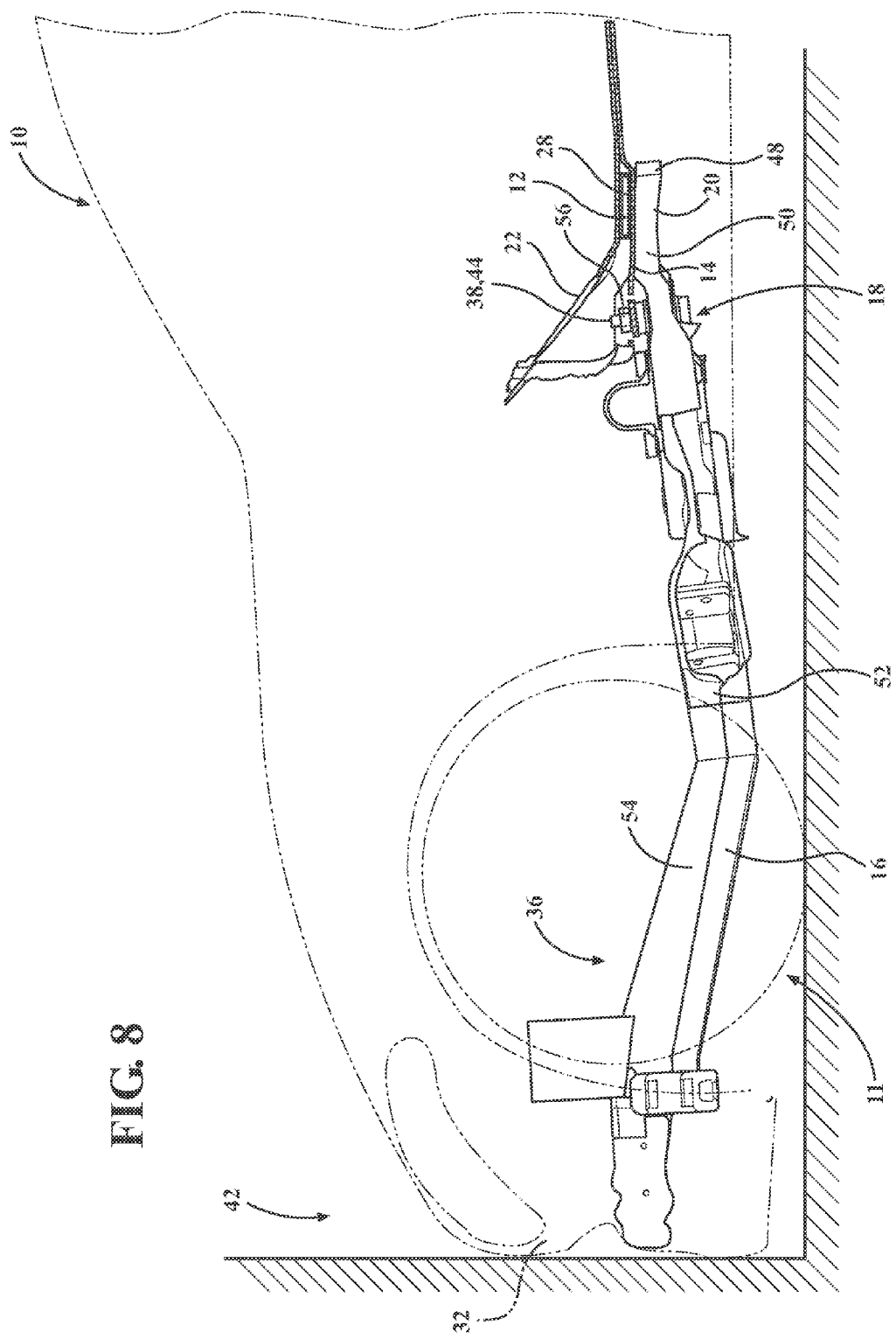
FIG. 8 is the side view of FIG. 6 during further rotation of the subframe relative to the frame during the frontal impact with the connection detached from the underbody.

With reference to the Figures, wherein like numerals indicate like parts throughout the several views, a vehicle 10 includes a chassis assembly 11 having a frame 12, an underbody 14 supported by the frame 12, and a subframe 16 connected to the underbody 14. With reference to FIGS. 6-8, a connection 18 connects the subframe 16 and the underbody 14. A lever 20 extends from the subframe 16 to the frame 12 for leveraging against the frame 12 when the subframe 16 is rotated relative to the frame 12 during a frontal impact to detach the connection 18 from the underbody 14, as shown in FIG. 8. Specifically, with reference to FIG. 7, during a frontal impact, the subframe 16 rotates (counter-clockwise in FIG. 7) and the lever 20 applies a force F1 to the frame 12, which results in a counteracting force F2 at the connection 18. As the subframe 16 continues to rotate (counter-clockwise in FIG. 7), the force F2 at the connection 18 reaches a level sufficient to fracture the underbody 14 at the connection 18, as shown in FIG. 8. In other words, during the frontal impact, the lever 20 leverages against the frame 12 until the connection 18 breaks from the underbody 14.

The rotation of the subframe 16 and the breakage of the connection 18 from the underbody 14 as a result of the leverage applied by the lever 20 against the frame 12 absorbs energy during the frontal impact. This rotation and ultimate breakage of the connection 18 softens the pulse during the frontal impact and reduces the Vehicle Pulse Index.

The vehicle 10 can be of any type. For example, the vehicle 10 can be an automobile, as shown in the Figures. Automobiles are subject to various standards including frontal impact standards as defined by Federal Motor Vehicle Safety Standards (FMVSS) and Insurance Institute for Highway Safety (IIHS) standards. The softened pulse and the reduction in the Vehicle Pulse Index during the frontal impact resulting from the rotation and breakage of the connection 18 affect testing for these standards.

Figure 1:
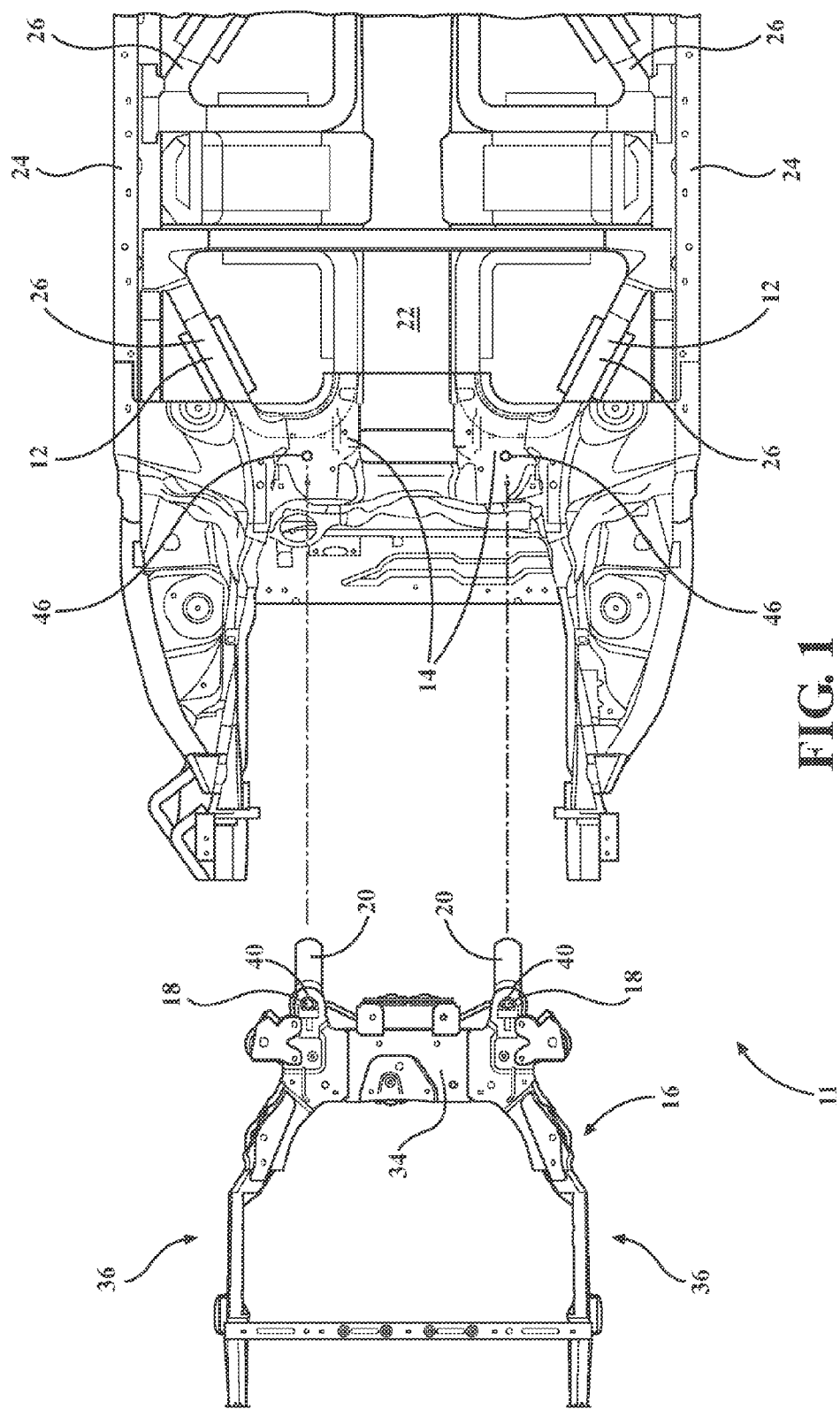
FIG. 1 is a bottom view of a portion of a vehicle including a chassis assembly having a frame, an underbody supported on the frame, and a subframe connected to the underbody.
Figure 2:
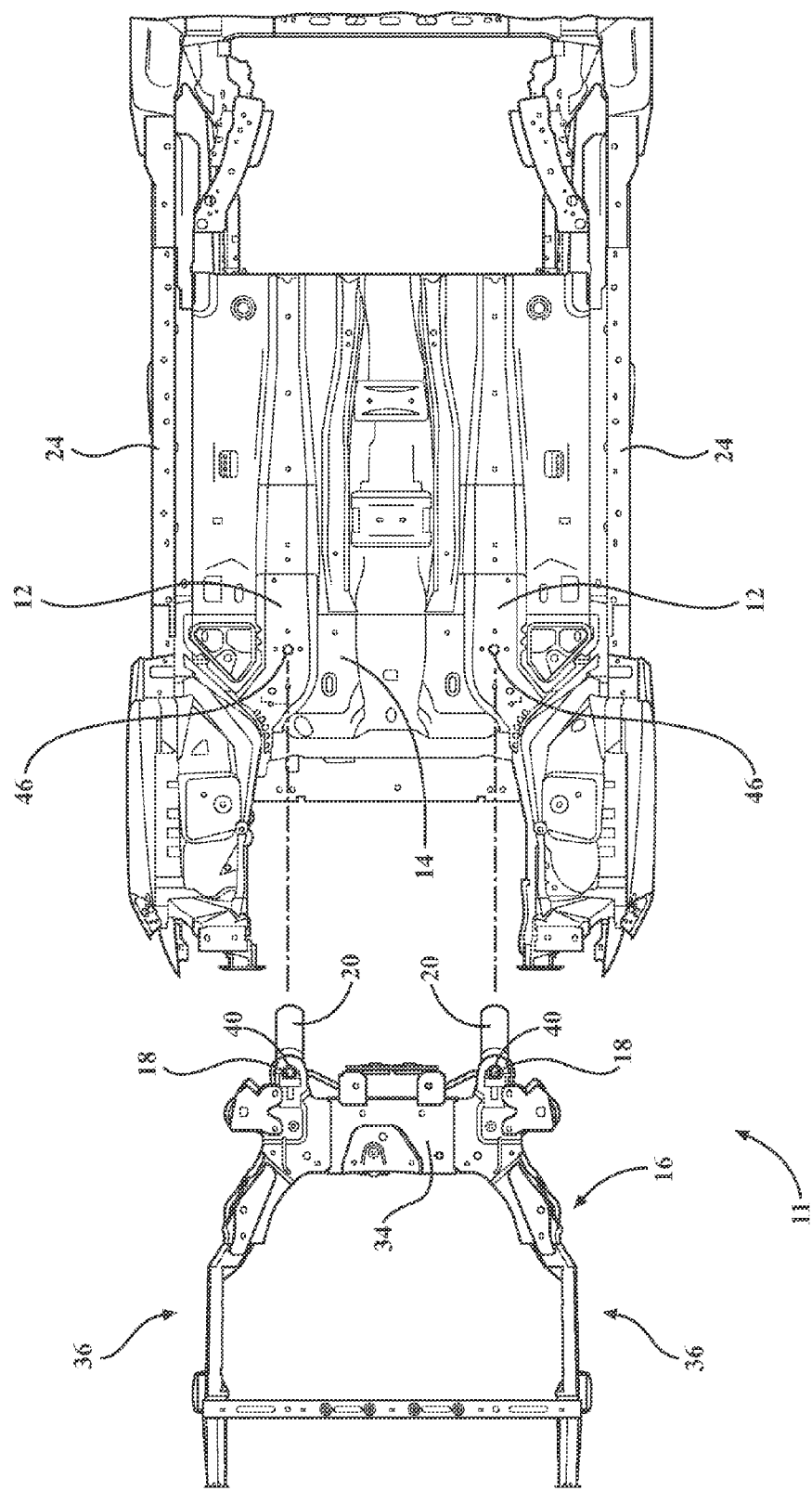
FIG. 2 is a bottom view of a portion of a vehicle including another embodiment of the chassis assembly having the frame with the underbody supported on the frame and the subframe connected to the underbody.
Figure 3:
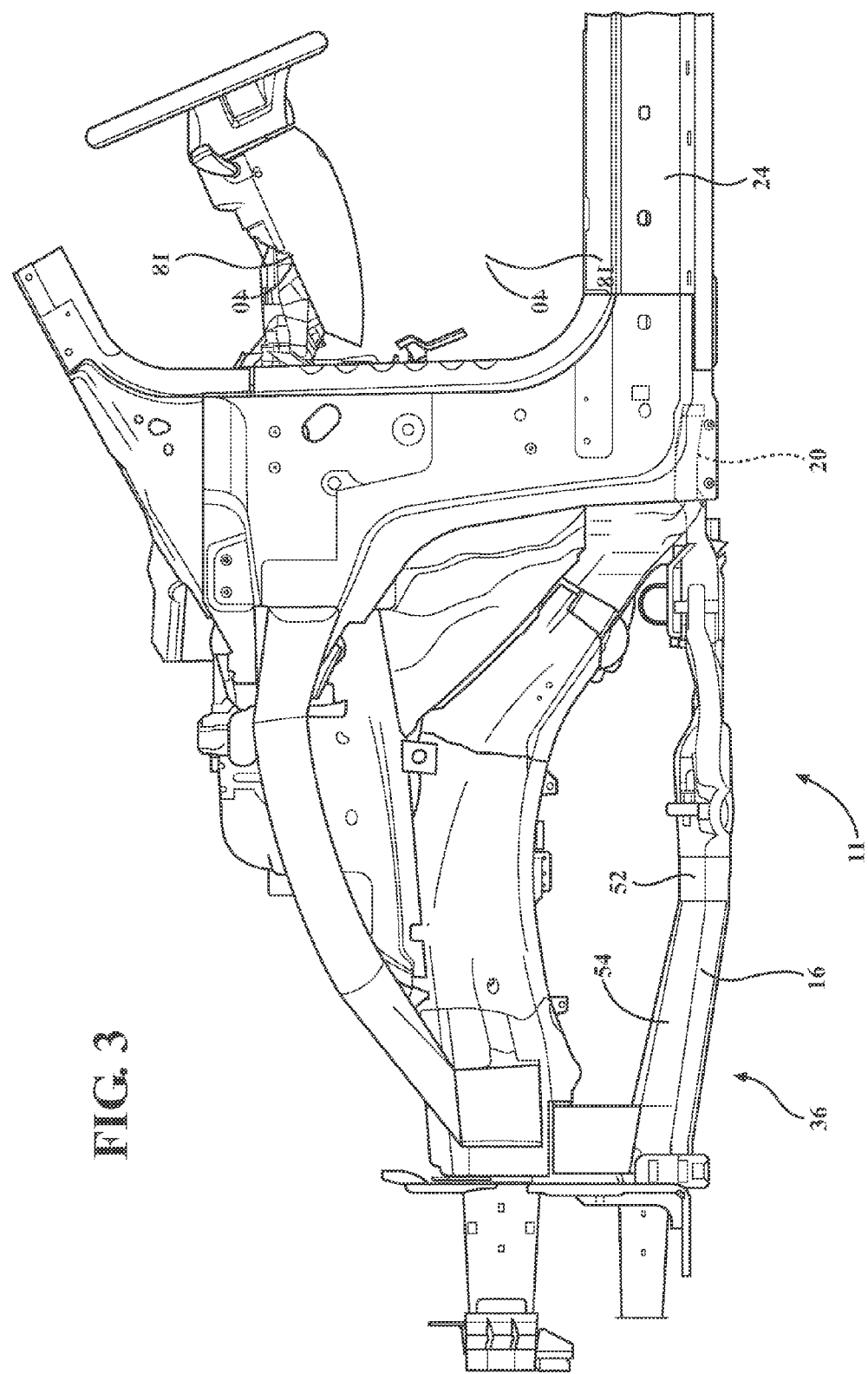
FIG. 3 is a side view of a portion of the vehicle of FIG. 1 with a lever of the subframe shown in hidden lines.

With reference to FIGS. 1-3, the frame 12 supports several components of the vehicle 10 including the underbody 14 and the subframe 16. In addition, for example, with reference to FIGS. 1, 2, and 6, the subframe 16 supports a floor 22, which may be formed of sheet metal. As another example, the frame 12 includes a rocker 24 for supporting body panels (not shown) of the vehicle 10.

The frame 12 may include a plurality of rails 26 having any suitable cross-sectional shape. The frame 12 can be of any type without departing from the nature of the present disclosure. For example, the frame 12 shown in FIG. 1 can be formed by hydroforming and the frame 12 shown in FIG. 2 is of the sled runner type. The frame 12, for example, can be formed of steel, aluminum, or any suitable material.

With reference to FIGS. 1, 2, and 6-8, the frame 12 defines a platform 28 configured to receive the lever 20. As shown in FIG. 6, the platform 28 is recessed to receive the lever 20. After the connection 18 is broken during a frontal impact, the subframe 16 can slide along the platform 28 as the subframe 16 moves rearwardly relative to the frame 12.

The subframe 16 supports various components of an engine (not shown), drivetrain (not shown), and/or suspension (not shown) of the vehicle 10. The subframe 16 extends forwardly from the underbody 14 toward a front bumper 32 of the vehicle 10. The subframe 16 can be formed, for example, of steel, aluminum, or any suitable material.

Figure 4:
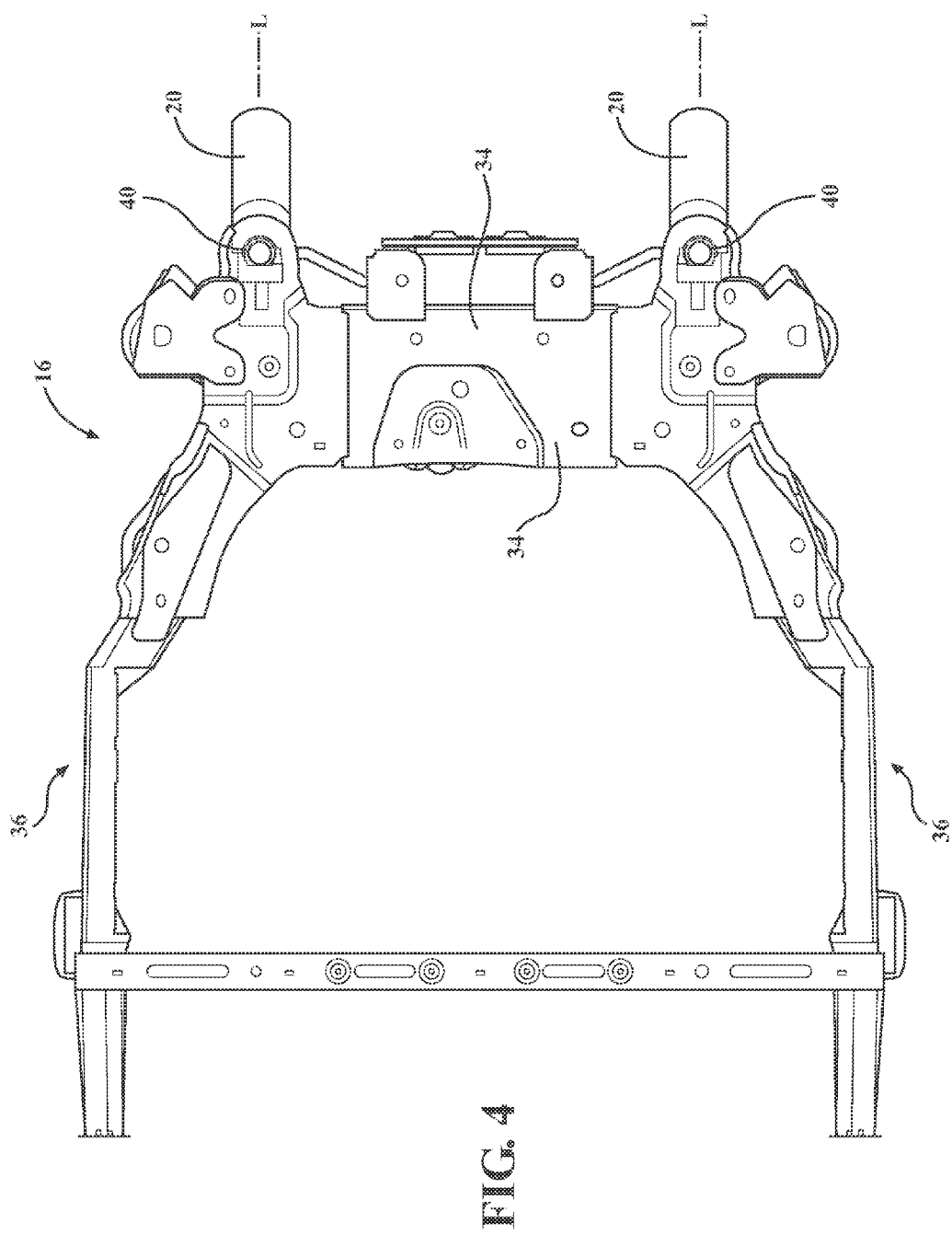
FIG. 4 is top view of the subframe including a pair of levers and with a pair of connections for connecting the subframe to the underbody.

With reference to FIG. 4, the subframe 16 includes a base 34 and an arm 36 extending from the base 34. Specifically, the subframe 16 includes a pair of arms 36 spaced from each other and extending from the base 34 of the subframe 16. A subframe 16 extension can be mounted to each arm 36 and each subframe 16 connection 18 is coupled to the front bumper 32 of the vehicle 10, as shown in FIGS. 6-8. The connection 18 is connected to a base 34, as set forth further below.

Each arm 36 extends forwardly and upwardly relative to the base 34, as shown in FIGS. 6-8. Specifically, each arm includes a first portion 52 extending generally horizontally when assembled to the underbody 14 and a second portion 54 extending forwardly and upwardly relative to the first portion 52. The geometry in which each arm 36 extends forwardly and upwardly urges the subframe 16 to rotate (counter-clockwise in FIGS. 6-8) during frontal impact, as shown in FIGS. 6-8. During frontal impact, the first portion 52 and the second portion 54 can bend relative to each other. Specifically, with reference to FIGS. 6-8, during frontal impact the first portion 52 rotates relative to the second portion 54 and the first portion 52 and/or second portion 54 bend relative to each other during this relative rotation.

As set forth above, the connection 18 connects the subframe 16 and the underbody 14. Specifically, as shown in FIGS. 1 and 2, two connections 18 are spaced from each other and connect the subframe 16 and the underbody 14. Both of the connections 18 may be identical. The connection 18 can be, for example, a pin 38 that extends through the subframe 16 and through the underbody 14. With reference to FIG. 6, the pin 38 extends along a pin axis P between the subframe 16 and the underbody 14.

With reference to FIGS. 1 and 2, the base 34 of the subframe 16 defines a hole 40 for receiving the connection 18, e.g., the pin 38, to connect the base 34 to an underbody 14 of the vehicle 10. The arms 36 extend forwardly relative to the hole 40 of the subframe 16 and, as set forth further below, the lever 20 extends rearwardly relative to the hole 40 of the subframe 16. In other words, the arms 36 extend forwardly relative to the hole 40 with respect to the vehicle 10, i.e., toward a front 42 of the vehicle 10, and the lever 20 extends rearwardly relative to the hole 40 with respect to the vehicle 10, i.e., toward a rear of the vehicle 10 (not shown) opposite the front 42 of the vehicle 10.

The pin 38 can be, for example, a bolt 44 that extends through the subframe 16 and the underbody 14 and threadedly engages a nut 56 to retain the pin 38 to the subframe 16 and the underbody 14. In such an embodiment, the bolt 44 extends along the pin axis P through the hole 40 of the subframe 16 and a hole 46 of the underbody 14. Alternatively to the pin 38, the connection 18 can be, for example, a weld between the subframe 16 and the underbody 14, a rivet between the subframe 16 and the underbody 14, any type of fastener between the subframe 16 and the underbody 14, etc.

The underbody 14 is supported by the frame 12 by, for example, welds, fasteners, etc. The underbody 14 defines the hole 46, shown in FIGS. 1 and 2, aligned with the hole 40 of the subframe 16 and receiving the connection 18, e.g., the pin 38, when the subframe 16 is connected to the underbody 14.

The underbody 14 is sheet metal, e.g., steel. The sheet metal of the underbody 14 may be 0.7-1.5 mm thick. Alternatively, the underbody 14 can be of any suitable material of any suitable thickness without departing from the nature of the present invention.

As set forth above, the lever 20 extends from the base 34 of the subframe 16. Specifically, as shown in FIG. 4, two levers 20 extend from the subframe 16 and a spaced from each other. The levers 20 shown in the Figures are identical to each other. Two levers 20 extend from the subframe 16, for example, in the Figures, however, any number of levers 20, i.e., one or more, can extend from the subframe 16.

As set forth above, the lever 20 is elongated rearwardly relative to the hole 40. In other words, the lever 20 is elongated from the subframe 16 in a direction toward the rear of the vehicle 10 when the subframe 16 is mounted to the underbody 14. This configuration results in the lever 20 leveraging against the frame 12 when the subframe 16 is rotated relative to the frame 12 during the frontal impact to detach the connection 18 from the underbody 14.

The lever 20 is fixed to the subframe 16 and moves with the subframe 16 as a unit. The lever 20 may be integral with the subframe 16, i.e., formed together with the subframe 16 as a unit. Alternatively, the lever 20 can be formed separately from the subframe 16 and subsequently fixed to the subframe 16 in any suitable fashion.

The lever 20 extends from the subframe 16 to the frame 12. Specifically, the lever 20 includes a contacting end 48 spaced from the base 34 of the subframe 16 for leveraging against the frame 12 when the subframe 16 is rotated relative to the frame 12 during a frontal impact. The contacting end 48 of the lever 20 can abut the frame 12 or can abut an intermediate component that is pinched between the contacting end 48 and the frame 12. For example, the underbody 14 is pinched between the contacting end 48 and the frame 12 in the Figures. As shown in FIG. 6, the contacting end 48 can include a curved portion spaced from the underbody 14 before frontal impact or, alternatively, can abut the underbody 14 along the length of the lever 20. During frontal impact, the contacting end 48 abuts the underbody 14 with the underbody 14 pinched between the lever 20 and the frame 12, as shown in FIG. 7, for example.

The lever 20 includes an intermediate portion 50 extending from the base 34 of the subframe 16 to the contacting end 48 of the lever 20. The intermediate portion 50 can, for example, contact the underbody 14 between the base 34 of the subframe 16 and the contacting end 48 of the lever 20.

The lever 20 is disposed below the frame 12. As set forth above, the arms 36 of the subframe 16 extend forwardly and upwardly relative to the base 34, which urges the subframe 16 to rotate (counter-clockwise in FIGS. 6-8) during frontal impact. As such, the disposition of the lever 20 below the frame 12 causes the lever 20 to leverage against the frame 12 during rotation of the subframe 16 relative to the frame 12, as shown in FIGS. 6-8.

The lever 20 and the connection 18 are configured such that the leveraging of the lever 20 against the frame 12 during frontal impact results in a force F2 (identified in FIG. 7) that pulls the connection 18 from the underbody 14. For example, in the configuration where the connection 18 is a pin 38, the leveraging of the lever 20 against the frame 12 during frontal impact results in the force F2 along the pin axis P to pull the pin 38 from the underbody 14.

Figure 5:
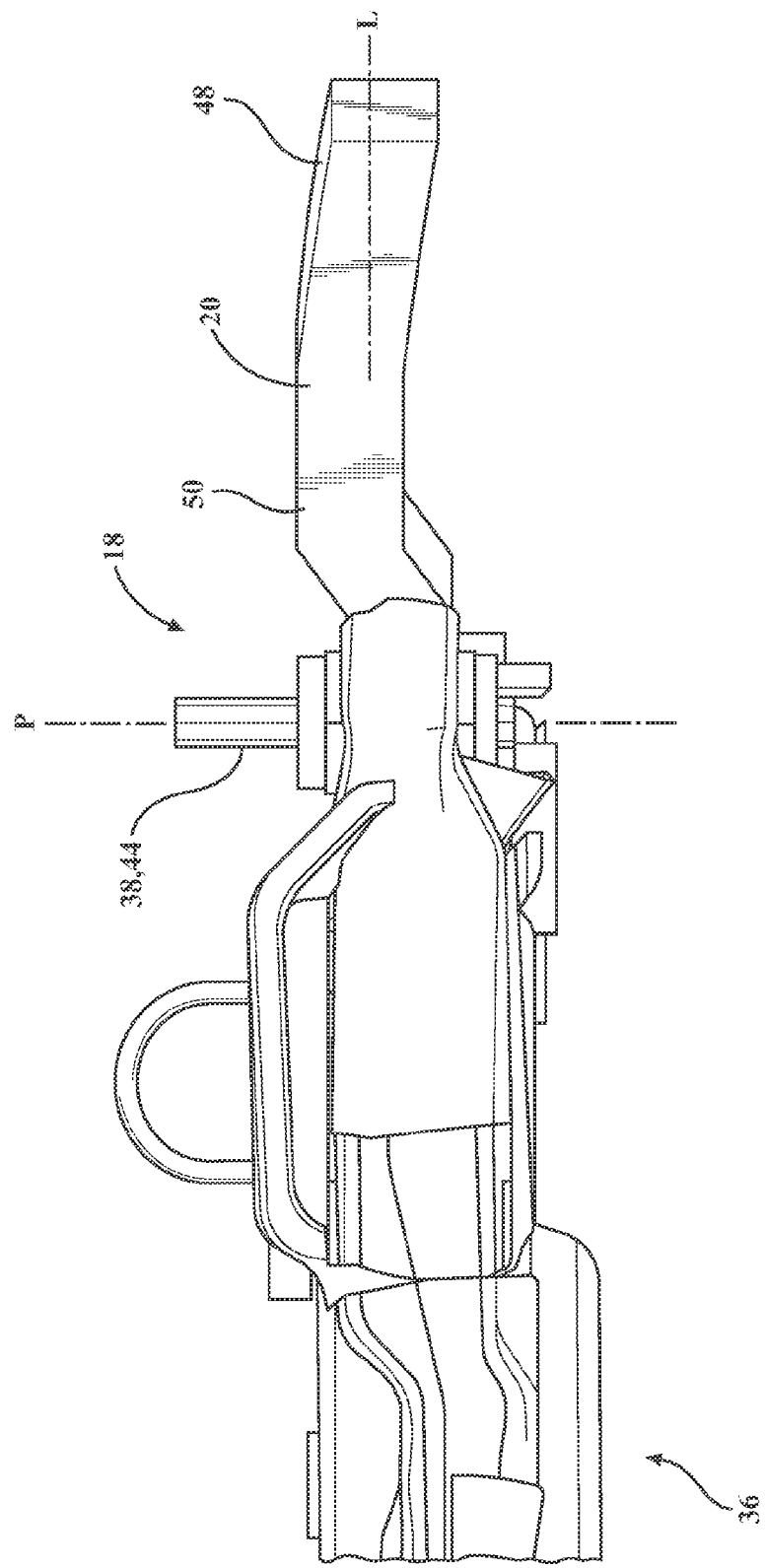
FIG. 5 is a side view of the subframe and one of the connections connected to the subframe.

The lever 20, for example, is elongated along an axis L that intersects the connection 18. Specifically, for example, the axis L that intersects the pin axis P, as best shown in FIG. 5. As such, as shown in FIG. 7, as the subframe 16 rotates during frontal impact, the lever 20 applies a force F1 against the frame 12, which results in the force F2 that pulls the pin 38 along the pin axis P to pull the pin 38 from the underbody 14.

The hole 40 extends about a hole axis H. With reference to FIG. 5, the hole axis H is aligned with the pin axis P when the pin 38 is received in the hole 40. The axis L of the lever 20 can intersect the hole axis H, as shown in FIGS. 4 and 5.

The lever 20 can have any suitable dimensions such that the lever 20 is elongated along the axis L. For example, the lever 20 can have a depth of 15-30 mm (i.e., vertically in FIG. 5), a length of 50-150 mm (i.e., horizontally in FIG. 5), and a width of 20-75 mm (i.e., into the page in FIG. 5). The lever 20 can be hollow with a wall thickness.

The frame 12 and lever 20 may be generally rigid during frontal impact. In other words, the frame 12 and the lever 20 generally do not deform as the subframe 16 rotates during frontal impact. As such, as the lever 20 leverages against the frame 12 during rotation of the subframe 16 during frontal impact, the force F1 at the contacting end 40 and the force F2 at the pin 38 are typically generally opposite and equal.

The underbody 14 may be frangible relative to the connection 18 and the lever 20 during the frontal impact. In other words, during rotation of the subframe 16 during frontal impact, the underbody 14 breaks at the connection 18 without breakage of the lever 20 or the connection 18. For example, the underbody 14 can be configured to break before the connection 18 and the lever 20 substantially deform. The underbody 14 may bend and deform prior to breakage, which absorbs energy from the frontal impact.

As set forth above, the operation of the subframe 16 during frontal impact is shown in FIGS. 6-8. As shown in FIG. 6, the subframe 16 is connected to the underbody 14 with the pin 38 and extends from the underbody 14 to the front bumper 32. The lever 20 extends from the subframe 16 to the frame 12 with the contacting end 48 of the lever 20 adjacent the frame 12. As shown in FIG. 7, during frontal impact, the subframe 16 rotates with the contacting end 48 of the lever 20 abutting the frame 12. During this rotation, the lever 20 leverages against the frame 12. This leverage applies the force F1 by the lever 20 against the frame 12 and the opposite force F2 at the pin 38 and the underbody 14.

During the frontal impact, the subframe 16 is forced rearwardly and the underbody 14 deforms during this rearward movement. Further, as the subframe 16 rotates during the frontal impact, the force F2 pulls the pin 38 away from the underbody 14, causing additional deformation of the underbody 14.

As the subframe 16 continues to rotate, the force F2 at the pin 38 reaches a level sufficient to break the underbody 14 at the pin 38, as shown in FIG. 8. At this point, the pin 38 releases from the underbody 14 and the subframe 16 moves rearwardly relative to the frame 12. This rearward movement and rotation of the subframe 16, deformation of the underbody 14, and breakage of the underbody 14 absorbs energy during the frontal impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A chassis assembly for a vehicle, the subframe assembly comprising:
   a frame and a subframe;
   an underbody supported by the frame;
   a connection connecting the subframe and the underbody; and
   a lever extending from the subframe to the frame for leveraging against the frame when the subframe is rotated relative to the frame during a frontal impact to detach the connection from the underbody.

2. The chassis assembly as set forth in claim 1 wherein the connection is a pin and the underbody is frangible relative to the pin and the lever during the frontal impact.

3. The chassis assembly as set forth in claim 1 wherein the connection is a pin that extends along a pin axis between the subframe and the underbody and wherein the lever is elongated along an axis that intersects the pin axis.

4. The chassis assembly as set forth in claim 1 wherein the lever is elongated along an axis that intersects the connection.

5. The chassis assembly as set forth in claim 1 wherein the underbody is sheet metal.

6. The chassis assembly as set forth in claim 5 wherein the sheet metal is 0.7-1.5 mm thick.

7. The chassis assembly as set forth in claim 6 wherein the lever has a depth of 15-30 mm.

8. The chassis assembly as set forth in claim 1 wherein the lever has a length of 50-150 mm.

9. The chassis assembly as set forth in claim 8 wherein the lever has a width of 20-75 mm.

10. The chassis assembly as set forth in claim 1 wherein the subframe includes a base connected to the connection and an arm extending forwardly and upwardly relative to the base.

11. The chassis assembly as set forth in claim 10 wherein the lever is disposed below the frame.

12. The chassis assembly as set forth in claim 1 wherein the subframe extends forwardly from the frame and the lever is elongated rearwardly.

13. The chassis assembly as set forth in claim 1 wherein the connection is a pin that extends through the subframe and the underbody.

14. The chassis assembly as set forth in claim 1 further comprising a bumper with the subframe extending from the frame toward the bumper.

15. A subframe for a vehicle, the subframe comprising:
   a base defining a hole for receiving a pin to connect the base to an underbody of the vehicle;
   an arm extending forwardly relative to the hole; and
   a lever elongated rearwardly relative to the hole for leveraging against a frame of the vehicle when the subframe is rotated relative to the frame during a frontal impact to detach the pin from the underbody.

16. The subframe as set forth in claim 15 wherein the hole extends about a hole axis and wherein the lever is elongated along an axis that intersects the hole axis.

17. The subframe as set forth in claim 15 wherein the lever has a depth of 15-30 mm.

18. The subframe as set forth in claim 15 wherein the lever has a length of 50-150 mm.

19. The subframe as set forth in claim 18 wherein the lever has a width of 20-75 mm.

20. The subframe as set forth in claim 15 wherein the arm extends forwardly and upwardly relative to the base.

* * * * *